(12) United States Patent
Jeon

(10) Patent No.: US 11,539,403 B2
(45) Date of Patent: Dec. 27, 2022

(54) USER DEVICE USING NFC, AUTHENTICATION SYSTEM AND OPERATION METHOD THEREOF

(71) Applicant: Samsung Electronics Co., Ltd., Suwon-si (KR)

(72) Inventor: Bongsu Jeon, Mungyeong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 236 days.

(21) Appl. No.: 16/876,593

(22) Filed: May 18, 2020

(65) Prior Publication Data

US 2021/0126674 A1  Apr. 29, 2021

(30) Foreign Application Priority Data

Oct. 29, 2019 (KR) .................. 10-2019-0135328

(51) Int. Cl.
| | | |
|---|---|---|
| H04B 5/00 | (2006.01) | |
| H04W 12/06 | (2021.01) | |
| H04L 9/08 | (2006.01) | |
| H04W 12/041 | (2021.01) | |
| H04W 12/069 | (2021.01) | |
| H04W 12/0431 | (2021.01) | |

(52) U.S. Cl.
CPC ......... *H04B 5/0062* (2013.01); *H04L 9/0822* (2013.01); *H04W 12/041* (2021.01); *H04W 12/0431* (2021.01); *H04W 12/069* (2021.01); *H04L 2209/80* (2013.01)

(58) Field of Classification Search
None
See application file for complete search history.

(56) References Cited

U.S. PATENT DOCUMENTS

| | | | |
|---|---|---|---|
| 9,042,818 B2 | 5/2015 | Khan | |
| 9,439,220 B2 | 9/2016 | Levy et al. | |
| 9,983,651 B2 | 5/2018 | Agrawal et al. | |
| 10,020,847 B2 | 7/2018 | Brahami et al. | |
| 10,164,687 B2 | 12/2018 | Jang | |
| 11,282,079 B2* | 3/2022 | Sabt | G06Q 20/385 |
| 2010/0117805 A1* | 5/2010 | Jeon | G06K 7/0008 |
| | | | 340/10.4 |
| 2016/0261995 A1* | 9/2016 | Zhu | G08B 21/182 |
| 2017/0255799 A1* | 9/2017 | Zhao | G06K 7/10366 |
| 2018/0158046 A1 | 6/2018 | Choi et al. | |
| 2019/0188675 A1* | 6/2019 | Park | G06F 3/04886 |
| 2019/0188683 A1 | 6/2019 | Soundararajan | |

FOREIGN PATENT DOCUMENTS

KR  101519639 B1  5/2015

* cited by examiner

*Primary Examiner* — Dionne Pendleton

(74) *Attorney, Agent, or Firm* — Harness, Dickey & Pierce, P.L.C.

(57) ABSTRACT

An operation method of a user device which performs near field communication (NFC) with a card reader includes downloading a service certification of a service, which the card reader provides, from a service authentication server through a network, sending status information of the user device to the card reader, receiving a service identifier (ID) which the card reader sends depending on the status information, performing an authentication process with the card reader based on a symmetric key when the service ID is present in the downloaded service certification, and sending an authentication success message to the card reader when the authentication process succeeds.

10 Claims, 11 Drawing Sheets

USER DEVICE USING NFC, AUTHENTICATION SYSTEM AND OPERATION METHOD THEREOF

CROSS-REFERENCE TO RELATED APPLICATIONS

This application claims priority under 35 U.S.C. § 119 to Korean Patent Application No. 10-2019-0135328 filed on Oct. 29, 2019, in the Korean Intellectual Property Office, the disclosures of which are incorporated by reference herein in their entireties.

BACKGROUND

Example embodiments of the inventive concepts described herein relate to an electronic device. For example, at least some example embodiments relate to a user device using near field communication (NFC), an authentication system, and/or an operation method thereof.

As mobile communication technologies develop, an electronic device, such as a user device, may provide various data communication functions as well as a call function. For example, the electronic device may provide a network-based communication service such as a music service, a video service, a digital broadcast service, a wireless Internet, a short message service (SMS), a multimedia messaging service (MMS), etc. Also, the electronic device may provide a service utilizing the NFC, as well as the network-based communication services. For example, the electronic device may provide a pay service, a transportation service, a smart card (e.g., a pass or an employee ID card) service, etc. using the NFC.

A secure service that is provided by the user device, such as a mobile phone, using the NFC is available only when the user observes the user device. For example, the user may utilize an iris recognition function or a fingerprint recognition function of the user device in a state where a display of the user device is turned on. However, conventionally, the security of the user device is prone to a malicious attack or hacking through the NFC, for example, in a state where the user does not pay attention to the user device.

SUMMARY

Example embodiments of the inventive concepts provide a user device capable of performing secure authentication without intervention of a user even in an inactive state of the user device using NFC communication, an authentication system, and an operation method thereof.

According to an example embodiment, a method of operating a user device which performs near field communication (NFC) with a card reader includes store a service certification downloaded from a service authentication server through a network; sending status information of the user device to the card reader; selectively receiving, from a card reader, a service identifier (ID) based on the status information; performing an authentication process with the card reader based on a symmetric key, in response to the service ID from the card reader corresponding to the service certification stored in the user device; and sending an authentication success message to the card reader in response to the authentication process being successful.

According to an example embodiment, a user device includes a host device configured to generate status information indicating an active state or an inactive state; and an NFC device configured to, store a service certification, and perform NFC communication with a card reader based on the status information by, sending the status information to the card reader, and performing, when the status information corresponds to the inactive state, an authentication process with the card reader based on whether a service ID received from the card reader corresponds to the service certification stored in the NFC device.

According to an example embodiment, an authentication system includes a card reader configured to register a service certification at a service authentication server; and a user device configured to, store the service certification downloaded from the service authentication server through a network, send status information of the user device to the card reader in a state where NFC communication with the card reader is possible, and perform, when the status information corresponds to an inactive state, an authentication process with the card reader based on the service certification.

BRIEF DESCRIPTION OF THE FIGURES

The above and other objects and features of example embodiments of the inventive concepts will become apparent by describing in detail example embodiments thereof with reference to the accompanying drawings.

DETAILED DESCRIPTION

Figure 1:
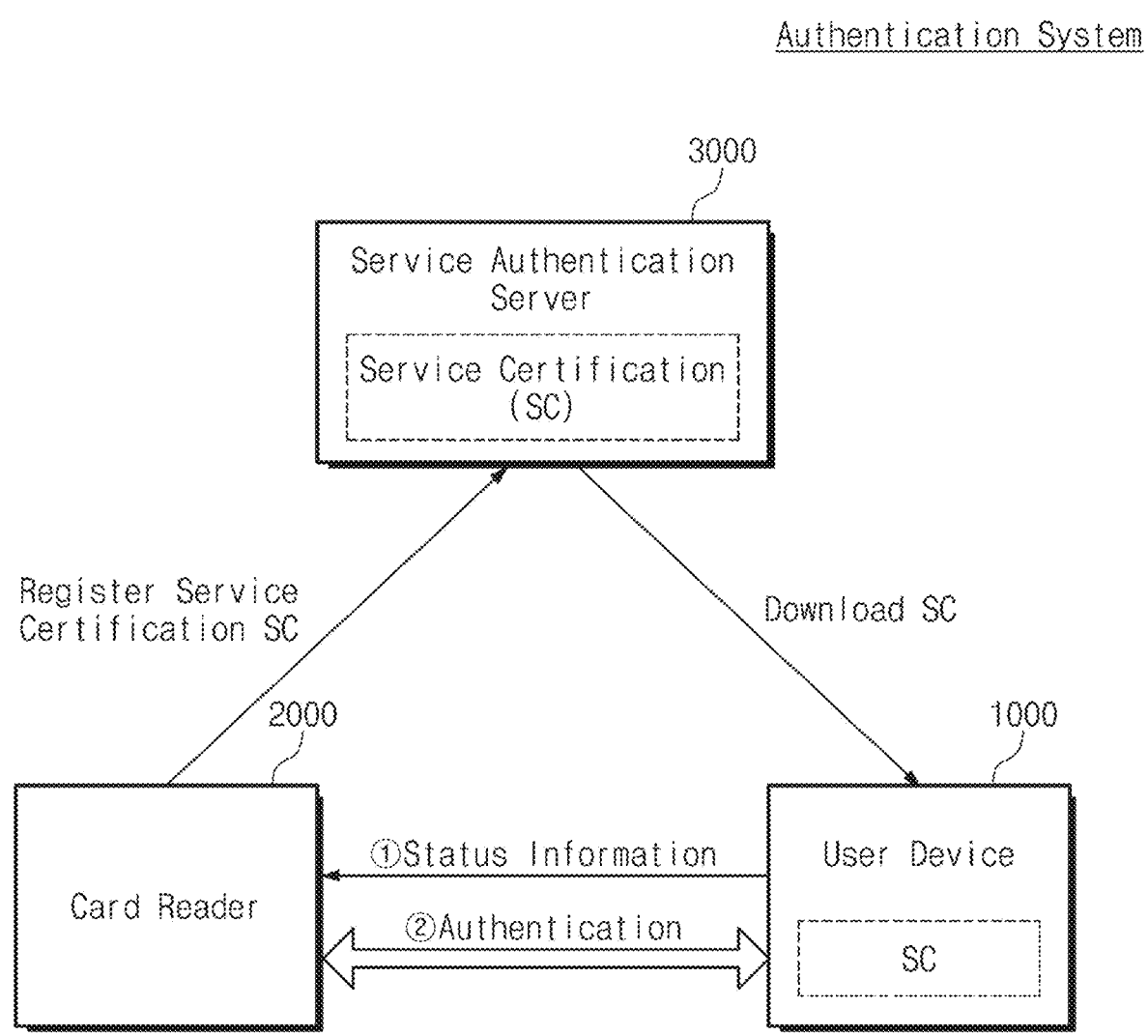
FIG. 1 is a block diagram illustrating an authentication system of a user device according to an example embodiment of the inventive concepts.

It should be understood that both the foregoing general description and the following detailed description are provided as examples, and it should be regarded as an additional description is provided. Reference numerals will be represented in detail in example embodiments of the inventive concepts, examples of which are illustrated in the accompanying drawings. Wherever possible, the same reference numerals are used in the drawings and the description to refer to the same or similar parts.

Below, example embodiments of the inventive concepts may be described in detail and clearly to such an extent that an ordinary one in the art easily implements the inventive concepts.

FIG. 1 is a block diagram illustrating an authentication system including devices using near field communication (NFC), according to an example embodiment of the inventive concepts.

Referring to FIG. 1, an authentication system includes a user device 1000, a card reader 2000, and a service authentication server 3000.

The user device 1000 may be an electronic device that includes an NFC card chip. The user device 1000 may be, for example, a mobile terminal capable of supporting one or more NFC functions, such as an NFC payment function. In general, the user device 1000 may perform payment or communication using the NFC. In general, in the case of performing the payment or communication using the NFC, an application that a user executes is driven and is used in an active state where a display (or a screen) is turned on. However, in the case where a power of the user device 1000 is turned off or the user device 1000 is not used for a given time, the display of the user device 1000 may be turned off or may enter a power saving mode. This state is called an "inactive state" of the user device 1000.

The security of the user device 1000 using the NFC is under the precondition of observation on the user device 1000. The reason is that various NFC-based payment or communication operations are perceived by the user though the NFC-based payment or communication operations are performed in the active state where the user observes the display of the user device 1000. However, in the inactive state where the display of the user device 1000 is turned off, the security of the user device 1000 is not defined in detail in the NFC protocol. In contrast, in one or more example embodiments, the user device 1000 of the inventive concepts may send status information SI indicating the active or inactive state of the user device 1000 to the card reader 2000. In the inactive state, the user device 1000 may perform an authentication process with the card reader 2000 by using a service certification SC downloaded in advance. The service certification SC may be in advance registered at the service authentication server 3000 by the card reader 2000 or a provider and may be downloaded to the user device 1000 by the user.

The card reader 2000 may communicate with the user device 1000 through the NFC in a contactless manner. By using the NFC, the card reader 2000 may perform the following functions with the user device 1000: contactless mobile pay, personal authentication, and/or data exchange. Example embodiments of the inventive concepts will be described based on the example that the card reader 2000 provides a service such as mobile pay. However, example embodiments are not limited thereto.

The card reader 2000 may first register the service certification SC at the service authentication server 3000 for the purpose of supporting an authentication function in the inactive state of the inventive concepts. For example, the card reader 2000 may be a terminal, which provides a contactless mobile pay service, such as a transit smart card (or a transportation card). The card reader 2000 or the provider operating the card reader 2000 may register the service certification SC at the service authentication server 3000 for the purpose of providing a secure performance of the user device 1000. The service certification SC may include a service identifier (ID) and a public key of the card reader 2000.

When the user device 1000 storing the service certification SC is close to the card reader 2000 within a given distance, the user device 1000 and the card reader 2000 may try communication (e.g., technology communication). For example, when mutual hardware recognition is made between the user device 1000 and the card reader 2000, the user device 1000 sends the status information SI to the card reader 2000.

In the case where the card reader 2000 recognizes that the status information SI indicates the active state, the card reader 2000 may consider that the user may currently be able to observe the user device 1000. In this case, the user device 1000 and the card reader 2000 may immediately perform NFC protocol communication without an authentication process. In the above case, the authentication may be performed through specific authentication hardware (e.g., an iris recognition or fingerprint recognition device) included in the user device 1000.

In contrast, in the case where the card reader 2000 recognizes that the status information SI indicates the inactive state, the card reader 2000 may determine that the user device 1000 is in a power-off state, in a power saving mode, a display off state, or another state in which the user may currently not be able to observe the user device 1000. In this case, the card reader 2000 and the user device 1000 may perform the authentication process according to an example embodiment of the inventive concepts based on the shared service certification SC.

The service authentication server 3000 stores the service certification SC that is provided from the card reader 2000 or from the provider that is operating the card reader 2000. In the case where a download request is received from the user of the user device 1000, the service authentication server 3000 may send the service certification SC to the user device 1000. The service authentication server 3000 may communicate with the card reader 2000 and the user device 1000 through a wired or wireless network.

According to example embodiments of the inventive concepts described above, in the authentication system, the user device 1000 provides the status information SI to the card reader 2000. In the case where the status information SI provided from the user device 1000 indicates the inactive state, the card reader 2000 may perform the authentication process of the inventive concepts based on the service certification SC shared through the service authentication server 3000. An attack or hacking that occurs in the inactive state may be blocked through the service certification-based authentication process performed in the inactive state of the user device 1000.

Figure 2:
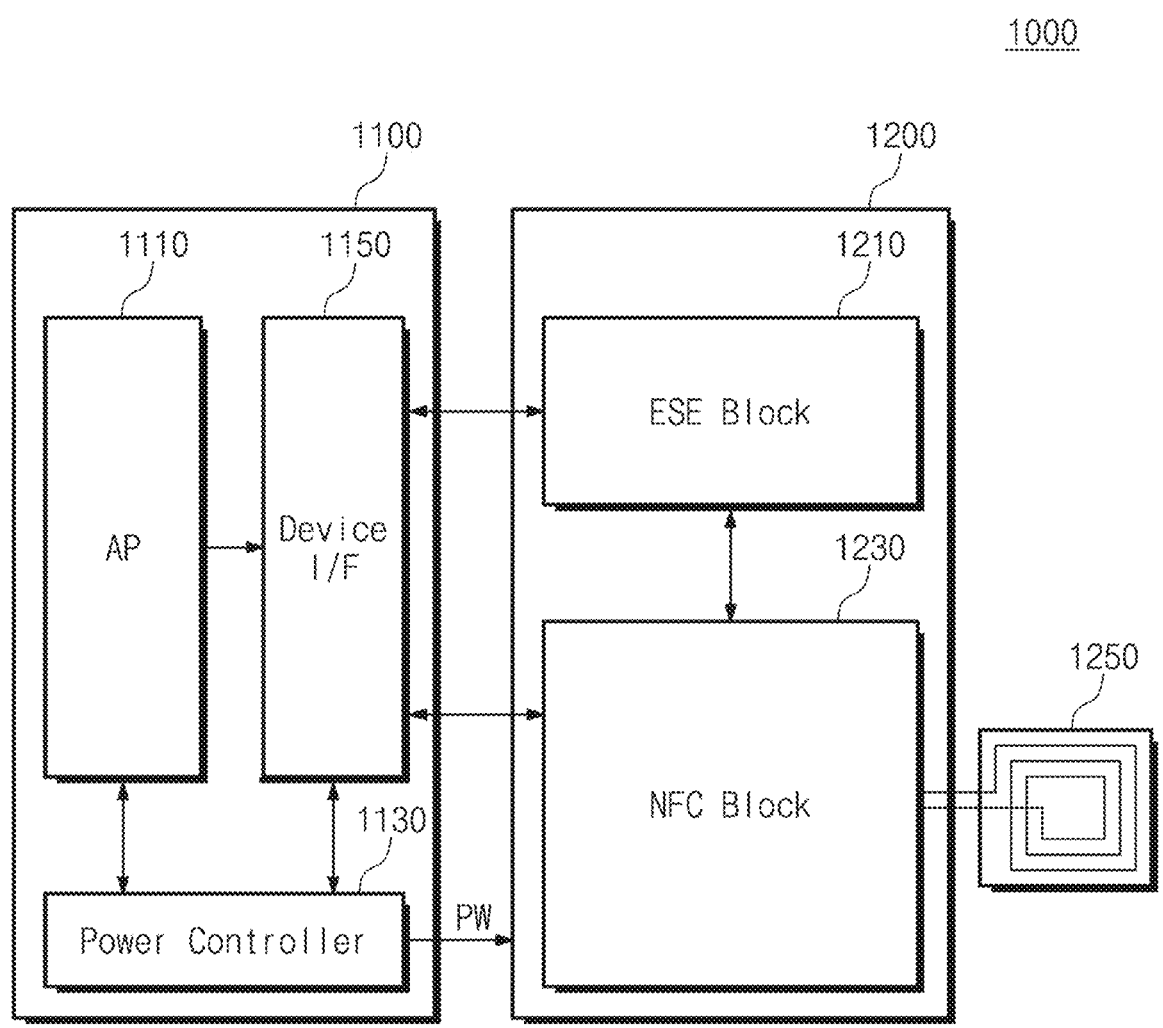
FIG. 2 is a block diagram illustrating a configuration of a user device of FIG. 1 according to an example embodiment of the inventive concepts.

FIG. 2 is a block diagram illustrating a configuration of a user device of FIG. 1. Referring to FIG. 2, the user device 1000 may include a host device 1100, an NFC device 1200, and an NFC antenna 1250.

The host device 1100 may supply a power to the NFC device 1200 and may communicate with the card reader 2000 through the NFC device 1200. In the active state, the host device 1100 may skip the NFC authentication process of example embodiments of the inventive concepts and may perform protocol communication with the card reader 2000. In the inactive state, the communication between the host device 1100 and the card reader 2000 may be possible only after the authentication process with the card reader 2000 is completed by the NFC device 1200.

Here, the active state refers to a state where the host device 1100 has been operated (or manipulated) or used by the user within, for example, a desired (or, alternatively, a preset) period of time. For example, the active state means a state where a web search is made or has recently been made by the user or a state where the user is or has recently been on the phone. The inactive state means an off state of the display starting when the user has not manipulate the user device 1000 within the desired (or, alternatively, the present) period of time or leaves the user device 1000 alone during the desired (or, alternatively, the present) period of time. Alternatively, the inactive state may refer to a state where the user listens to music through an accessory such as an earphone, with the display turned off. Alternatively, the inactive state may mean a sleep mode of the user device 1000 or a power-off state where the power is turned off. The inactive state may include overall situations where the user may be likely to not be observing the user device 1000.

In an example embodiment, the host device 1100 may include an application processor 1110, a power controller 1130, and a device interface 1150. The application processor 1110 executes various applications driving the host device 1100. For example, the application processor 1110 executes software (e.g., an application program, an operating system, and device drivers) of the host device 1100. The application processor 1110 may be implemented with a homogeneous multi-core processor or a heterogeneous multi-core processor.

The power controller 1130 supplies and controls the power of the user device 1000. The power controller 1130 may be, for example, a power management integrated circuit (PMIC). The power controller 1130 converts the power from a battery (not illustrated) by using a DC-DC converter or a voltage regulator, so as to be appropriate for a target device. The power controller 1130 may decrease or block the power being supplied, depending on the instruction of the application processor 1110. For example, while the user makes use of the user device 1000, that is, in the active mode, the power controller 1130 may supply the power to the application processor 1110 or the NFC device 1200. In contrast, in the inactive mode where the user does not make use of the user device 1000, the power controller 1130 may reduce, minimize or block the power being supplied to the display or unused components.

The device interface 1150 may access the NFC device 1200 depending on a request of the application processor 1110. That is, the device interface 1150 provides an interface between the host device 1100 and the NFC device 1200. The device interface 1150 may use a secure channel (e.g., a secure SPI) for the purpose of communicating with a secure block 1210, such as embedded secure element (ESE) block of the NFC device 1200. The status information SI that includes information indicating whether the display of the host device 1100 is turned on or off may be sent to an NFC block 1230 of the NFC device 1200 through the device interface 1150. The device interface 1150 may be, for example, a serial communication protocol such as I2C (Inter-Integrated Circuit), UART (Universal Asynchronous Receiver/Transmitter), and SPI (Serial Peripheral Interface).

The NFC device 1200 include the secure block 1210 (e.g., embedded secure element (ESE) block) and the NFC block 1230. The NFC device 1200 may communicate with the card reader 2000 through the NFC antenna 1250. Here, the secure block 1210 and the NFC block 1230 may be implemented in the form of a single chip.

The secure block 1210 stores the service certification SC that the host device 1100 downloads from the service authentication server 3000. The service certification SC includes the service identifier (ID) (or a provider ID) and public key information. The secure block 1210 may perform the authentication process in the inactive state of the host device 1100. That is, the secure block 1210 compares the service ID provided from the card reader 2000 with the service ID of the service certification SC stored in the secure block 1210. When the two service IDs are matched, the secure block 1210 may perform one or more of the following operations for performing the authentication process with the card reader 2000: public key generation, random number generation, and encryption and decryption.

The NFC block 1230 provides interfacing for performing NFC communication with the host device 1100 and the card reader 2000. The NFC block 1230 monitors whether the communication with the card reader 2000 is possible, and performs the technology communication with the card reader 2000 when the communication is possible. In particular, in the case where the NFC block 1230 receives information corresponding to the inactive state from the host device 1100, the NFC block 1230 sends the status information SI indicating the inactive state of the user device 1000 to the card reader 2000. The status information SI may be in the form of an RF instruction that is sent to the card reader 2000 through the NFC antenna 1250.

According to the above description, the user device 1000 includes the NFC device 1200 that stores the service certification SC downloaded from the service authentication server 3000. In the case where the host device 1100 is in the inactive state, the NFC device 1200 may perform an authentication operation with the card reader 2000 based on the service certification SC. Accordingly, the user device 1000 according to one or more example embodiments of the inventive concepts may provide high security against a man-in-the-middle attack to which the user device 1000 is easily exposed in the inactive state.

Figure 3:
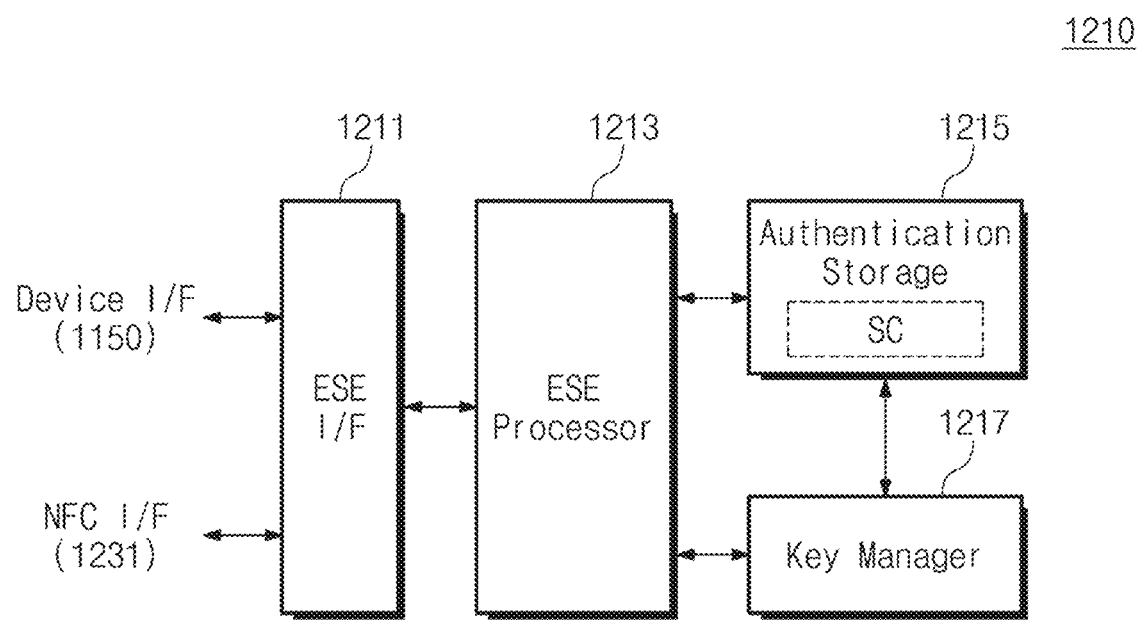
FIG. 3 is a block diagram illustrating a secure block of FIG. 2 in detail.

FIG. 3 is a block diagram illustrating a secure block of FIG. 2 in detail. Referring to FIG. 3, the secure block 1210 includes a secure interface 1211 (or an ESE interface), a secure processor 1213 (or an ESE processor), authentication storage 1215, and a key manager 1217. The secure block 1210 may be formed in one chip together with the NFC block 1230. However, the way to implement the secure block 1210 is not limited to the present disclosure. That is, it may be well understood that the secure block 1210 may be implemented with a chip independent of the NFC block 1230.

The secure interface 1211 provides interfacing between the secure block 1210 and the host device 1100 and between the secure block 1210 and the NFC block 1230. The secure interface 1211 may communicate with the application processor 1110 through the device interface 1150 of the host device 1100. The secure block 1210 may be provided with the service certification SC, which the host device 1100 downloads, through the secure interface 1211. The secure interface 1211 may communicate with the device interface 1150 in the form of a serial peripheral device interface SPI having a secure function. In addition, the secure interface 1211 may communicate with the NFC block 1230 in compliance with a particular protocol (e.g., a single wire protocol). The secure interface 1211 may exchange a random number, an encrypted symmetric key, etc. with an NFC interface 1231 in the secure authentication process that is initiated in the inactive state of the host device 1100.

The secure processor 1213 processes various operations of the secure block 1210. The secure processor 1213 may perform overall operations for receiving the service certification SC from the host device 1100. In addition, the secure processor 1213 may search the authentication storage 1215 for a service ID provided through the NFC block 1230 and may determine whether the found service ID and the provided service ID are matched. In addition, the secure processor 1213 may request the symmetric key generation operation, the random number generation operation, and the encryption and decryption operation from the key manager 1217. In addition, the secure processor 1213 may decide a time slot, which corresponds to a response time promised in the transaction with the card reader 2000, in consideration of a hardware characteristic of the secure block 1210 or the NFC block 1230. For example, the secure processor 1213 may decide a time slot T2 for responding to a request of the card reader 2000, in consideration of a processing speed of the secure block 1210. In addition, the secure processor 1213 may allow the key manager 1217 to encrypt a value of the time slot T2 by using a symmetric key and may transfer the encrypted value to the card reader 2000. In addition, the secure processor 1213 may decrypt an encrypted time slot T1 sent from the card reader 2000 and may send the decrypted time slot T1 to the NFC block 1230. The secure processor 1213 may exchange and compare encrypted random numbers with the card reader 2000 for the purpose of determining whether the authentication is successfully performed. This will be described in detail with reference to drawings below.

The authentication storage 1215 stores the service certification SC downloaded from the service authentication server 3000. The authentication storage 1215 may store, for example, a service ID, a public key to be used in the authentication process with the card reader 2000, etc. The authentication storage 1215 may be implemented with a nonvolatile memory such as a one time programming (OTP) memory or a flash memory.

The key manager 1217 may generate a symmetric key "K" to be used for service authentication with the card reader 2000, depending on a request of the secure processor 1213. The key manager 1217 may encrypt the symmetric key "K" by using a public key "P" stored in the authentication storage 1215. The encrypted symmetric key "K" may be sent to the card reader 2000, and the key manager 1217 may decrypt encrypted random numbers by using the symmetric key "K" provided from the card reader 2000. In addition, the key manager 1217 may generate a random number and may encrypt the random number by using the symmetric key "K". The key manager 1217 may generate a random number and may encrypt the random number by using the symmetric key "K". The key manager 1217 decrypts an encrypted random number provided from the card reader 2000. Besides, the key manager 1217 may encrypt a value of the time slot T2 to be sent to the card reader 2000 by using the symmetric key "K". Also, the key manager 1217 may decrypt a value of the time slot T1 sent from the card reader 2000 by using the symmetric key "K".

The configuration and the function of the secure block 1210 according to some example embodiments of the inventive concepts are briefly described above. However, it may be well understood that the configuration and the function of the secure block 1210 of example embodiments of the inventive concepts are variously modified or changed. For example, functions of hardware components performing secure operations may be implemented by using software executed by processing circuitry.

Figure 4:
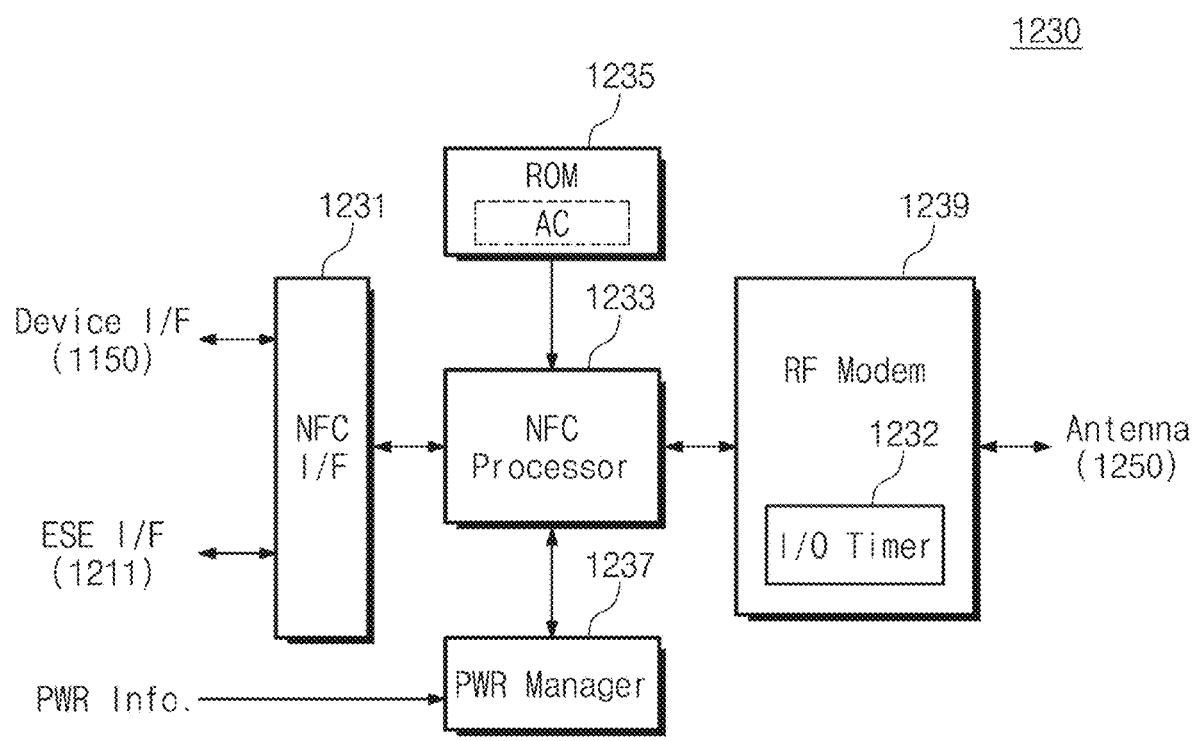
FIG. 4 is a block diagram illustrating a configuration of an NFC block of FIG. 2.

FIG. 4 is a block diagram illustrating a configuration of an NFC block of FIG. 2.

Referring to FIG. 4, the NFC block 1230 may include the NFC interface 1231, an NFC processor 1233, a ROM 1235, a power manager 1237, and an RF modem 1239.

The NFC interface 1231 provides interfacing between the NFC block 1230 and the host device 1100 and between the NFC block 1230 and the secure block 1210. The NFC interface 1231 may communicate with the application processor 1110 through the device interface 1150 of the host device 1100. The NFC block 1230 may receive on/off information of a display (or a screen) of the host device 1100 or power-off information of the host device 1100 through the NFC interface 1231. The authentication process of the inventive concepts is initiated in the off state of the display or the power-off state. In this case, the NFC interface 1231 may perform communication with the secure interface 1211 of the secure block 1210 for the purpose of performing the authentication.

The NFC processor 1233 processes various operations of the NFC block 1230 associated with wireless communication. The NFC processor 1233 may execute a code stored in the ROM 1235 and may perform NFC technology communication or NFC protocol communication. In addition, the NFC processor 1233 may perform the authentication process of the inventive concepts in the off state of the display or the power-off state.

The ROM 1235 stores the code for driving the NFC block 1230. The code stored in the ROM 1235 is sent to the NFC processor 1233 in the booting or resetting of the NFC device 1200, and the driving of the NFC processor 1233 is possible. An authentication code AC for performing the authentication process in the inactive state of the inventive concepts may be stored in the ROM 1235. The authentication code AC includes a code for sending the status information SI to the card reader 2000 in the inactive state of the host device 1100 and for hardwarely operating and controlling the NFC block 1230 for the purpose of performing the authentication process based on the status information SI. The authentication code AC may include codes capable of controlling whether to permit the RF communication depending on a result (success/fail) of performing the authentication process according to an example embodiment of the inventive concepts. In the off state of the display or in the power-off state, the NFC processor 1233 may execute the authentication code AC stored in the ROM 1235.

The power manager 1237 may monitor a power state of the user device 1000 with reference to power information "PWR Info." provided from the power controller 1130 of the host device 1100. For example, when the power manager 1237 receives information indicating the power-off state from the power controller 1130, the power manager 1237 may send power-off information to the NFC processor 1233. In this case, the NFC processor 1233 may execute the authentication code AC for the purpose of activating the secure authentication process of example embodiments of the inventive concepts. As the authentication code AC is executed, overall functions of the secure block 1210 may be activated. In addition, the NFC processor 1233 may send the status information SI corresponding to the inactive state in the technology communication with the card reader 2000.

The RF modem 1239 performs NFC communication with the card reader 2000 under control of the NFC processor 1233. The RF modem 1239 modulates a transmit signal to be sent to the card reader 2000 prior to sending the transmit signal to the antenna 1250. The RF modem 1239 may demodulate a receive signal received from the antenna 1250 and may send the demodulated signal to the NFC processor 1233 or any other target devices. In particular, the RF modem 1239 may include an input/output timer 1232 for the purpose of performing the authentication process using a time slot of the inventive concepts.

The input/output timer 1232 may count a transmission and reception time corresponding to the first time slot T1 provided from the card reader 2000. For example, the input/output timer 1232 may count whether a time from a time point at which a request is transmitted from the RF modem 1239 to a time point at which the card reader 2000 responds to the request is within the first time slot T1. A time slot value may be decided in consideration of variables such as a length of a random number and a processing capacity.

The configuration and the operation of the NFC block 1230 are described above. However, it may be well understood that the NFC block 1230 further includes components for an additional performance although not illustrated in FIG. 4.

Figure 5:
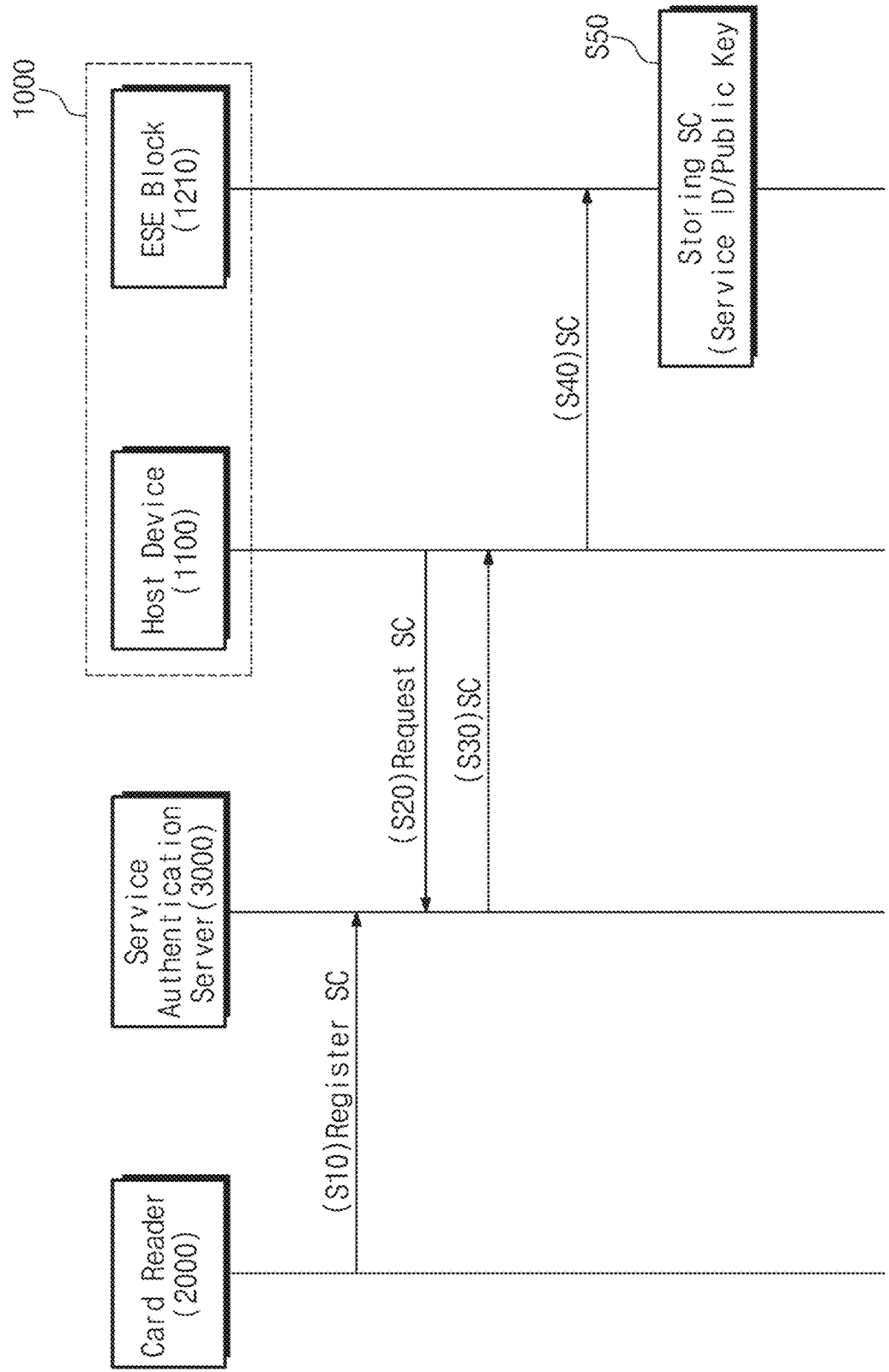
FIG. 5 is a diagram illustrating a method of registering and downloading a service certification of the inventive concepts.

FIG. 5 is a diagram illustrating a method of registering and downloading a service certification according to one or more example embodiments of the inventive concepts.

Referring to FIG. 5, the service certification SC is registered at the service authentication server 3000 by the card reader 2000. The user that wants to use the authentication process according to one or more example embodiments of the inventive concepts may manipulate the user device 1000 such that the service certification SC is downloaded from the service authentication server 3000.

In operation S10, the card reader 2000 may register the service certification SC at the service authentication server 3000. The service certification SC may be registered at the service authentication server 3000 by the card reader 2000 or the provider of the card reader 2000.

In operation S20, the user of the user device 1000, which wants to improve a secure performance in the inactive state, may request to download the service certification SC from the service authentication server 3000. The host device 1100 that is included in the user device 1000 may be manipulated by the user so as to request the service certification SC from the service authentication server 3000 through a wired or wireless network.

In operation S30, the service authentication server 3000 sends the service certification SC to the user device 1000 through the wired or wireless network in response to the request of the user device 1000.

In operation S40, the host device 1100 of the user device 1000 sends the downloaded service certification SC to the secure block 1210 performing a secure function of the NFC device 1200.

In operation S50, the secure block 1210 may store the downloaded service certification SC in the authentication storage 1215.

The method of registering and downloading the service certification SC for performing the authentication process in the inactive state of the user device 1000 is described above. In the case where the service certification SC is stored in the secure block 1210 of the user device 1000, a condition for performing the authentication process in the inactive state according to example embodiments of the inventive concepts is satisfied.

Figure 6:
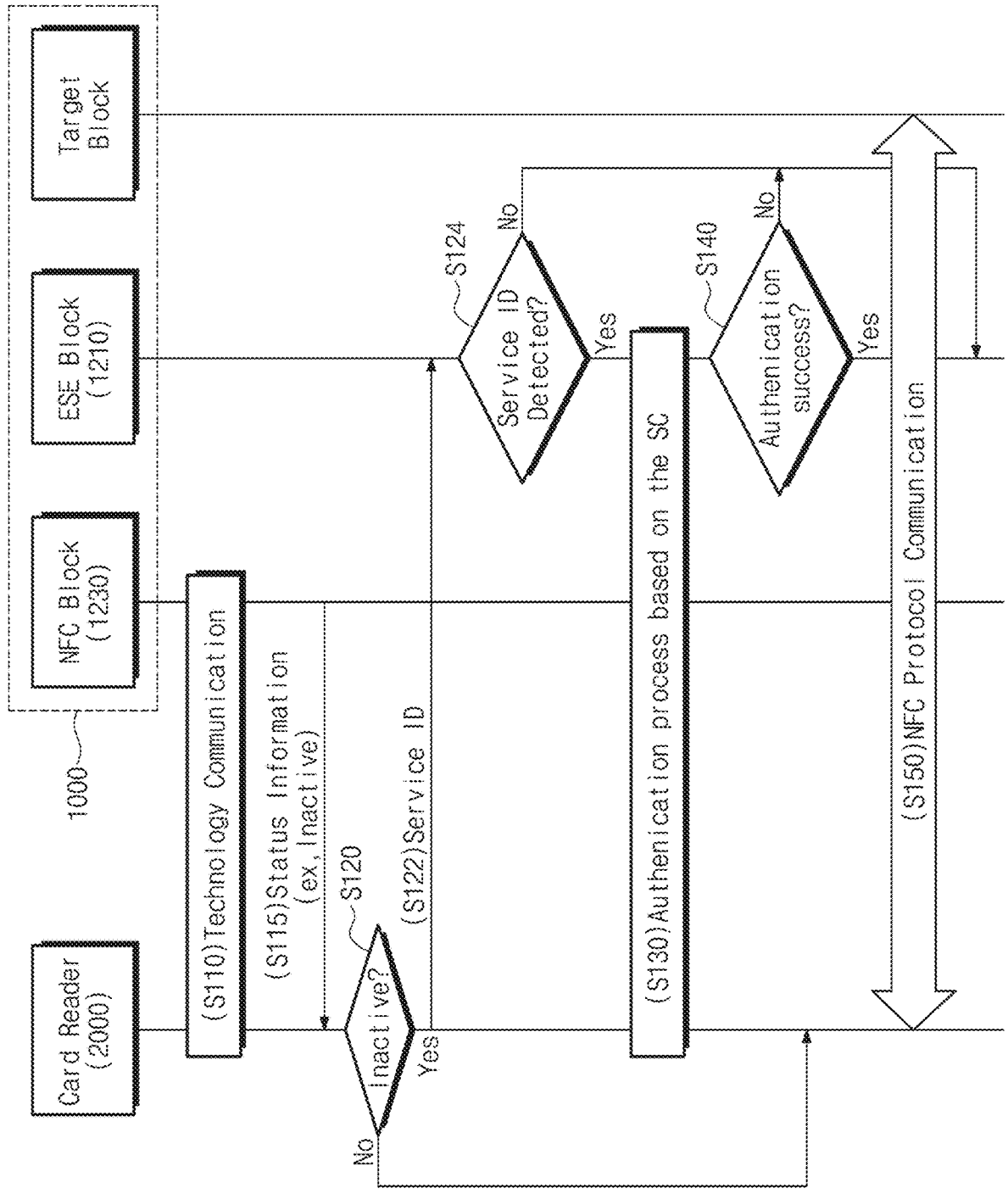
FIG. 6 is a diagram illustrating an authentication process between a card read and a user device of the inventive concepts.

FIG. 6 is a diagram illustrating an authentication process between a card read and a user device of the inventive concepts.

Referring to FIG. 6, when the user device 1000 is in the inactive state (e.g., the display off state), the authentication process according to an example embodiment of the inventive concepts is performed.

In operation S110, the technology communication is performed (or, alternatively, negotiated) between the user device 1000 and the card reader 2000. The technology communication may mean an operation in which each of the user device 1000 and the card reader 2000 detects an RF field and transfers an initial instruction of a ruled transfer speed. In the case where the user device 1000 and the card reader 2000 recognize RF fields mutually, transfer speed or wireless communication settings are mutually synchronized through the technology communication.

In operation S115, the user device 1000 sends the status information SI to the card reader 2000. The status information SI may be sent in operation S115 even while the technology communication initiated in operation S110 is performed. The status information SI may be, for example, information about whether the user device 1000 is in the active state or the inactive state. In the case where the user device 1000 is being used by the user or the display is turned on, the NFC block 1230 may send the status information SI indicating the active state to the card reader 2000. In contrast, in the case where the display of the user device 1000 is in the off state or the user device 1000 is in the power-off state, the NFC block 1230 may send the status information SI indicating the inactive state to the card reader 2000.

In operation S120, the card reader 2000 recognizes the status information SI provided from the user device 1000 and determines whether to perform the authentication process according to example embodiments of the inventive concepts or whether to perform NFC protocol communication, depending on the recognized status information SI. When it is determined that a state of the user device 1000 is the inactive state (Yes), the procedure proceeds to operation S122 for the purpose of performing the authentication process in the inactive state. In contrast, when it is determined that a state of the user device 1000 is the active state (No), the procedure proceeds to operation S150 for the purpose of performing the NFC protocol communication in the active state.

In operation S122, the card reader 2000 initiates the authentication process that is performed in the inactive state of the inventive concepts. That is, the card reader 2000 may send the service ID included in the service certification SC registered at the service authentication server 3000 to the user device 1000. The service ID sent from the card reader 2000 is provided to the secure block 1210 of the user device 1000.

In operation S124, the secure block 1210 that is provided with the service ID may search the authentication storage 1215 in the secure block 1210. In detail, the secure processor 1213 of the secure block 1210 may determine whether the service ID of the service certification SC stored in the authentication storage 1215 is matched with the sent service ID. When the service ID stored in the authentication storage 1215 is matched with the service ID sent from the card reader 2000 (Yes), the procedure proceeds to operation S130 for the purpose of performing the authentication process of the inventive concepts. In contrast, when the service ID that is matched with the service ID sent from the card reader 2000 is absent from the authentication storage 1215 (No), the authentication process according to example embodiments of the inventive concepts performed in the inactive state may be terminated. In this case, the user device 1000 may not answer to the card reader 2000.

In operation S130, the user device 1000 and the card reader 2000 perform the authentication process according to example embodiments of the inventive concepts based on the mutually shared service certification SC. That is, the authentication may be performed in a way to generate and exchange a symmetric key based on a public key included in the service certification SC and to generate and exchange a random number by using the exchanged symmetric key. In addition, the user device 1000 and the card reader 2000 may exchange a time slot indicating a ruled response time by using the symmetric key and may monitor the time slot and the response time.

In operation S140, whether the authentication process performed in operation S130 succeeds or fails is determined. When the authentication process according to example embodiments of the inventive concepts performed in the inactive state succeeds (Yes), the procedure proceeds to operation S150. When the authentication process according to example embodiments of the inventive concepts performed in the inactive state fails (No), the authentication process may be terminated. In this case, the user device 1000 or the card reader 2000 may not answer.

In operation S150, the protocol communication is performed between the user device 1000 and the card reader 2000. That is, a target block (e.g., an application processor) and the card reader 2000 may perform an additional operation through the NFC device 1200, such as a mutual data transfer or money pay.

The authentication process in the inactive state according to an example embodiment of the inventive concepts is briefly described above. It may be possible to improve a secure performance of the user device 1000, such as a mobile device or an electronic device, through the authentication process in the inactive state.

Figure 7:
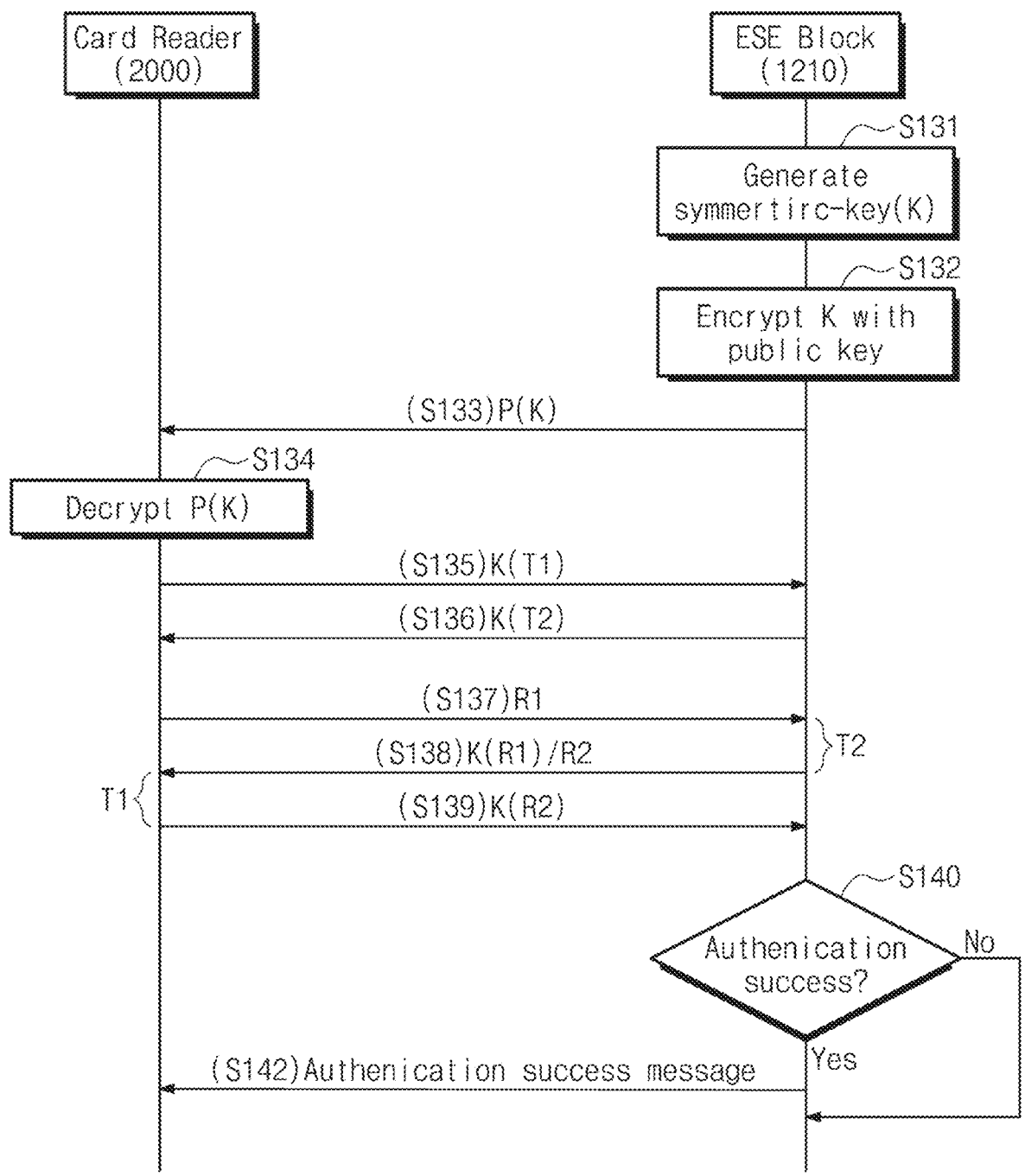
FIG. 7 is a diagram illustrating operation S130 of FIG. 6 in detail.

FIG. 7 is a diagram illustrating operation S130 of FIG. 6 in detail. Referring to FIG. 7, an authentication operation based on the service certification SC may be performed between the card reader 2000 and the secure block 1210 included in the user device 1000. The authentication process according to example embodiments of the inventive concepts is initiated when the service ID that the card reader 2000 sends is present in the authentication storage 1215.

In operation S131, the secure processor 1213 of the secure block 1210 may request the key manager 1217 to generate the symmetric key "K". The key manager 1217 generates the symmetric key "K" to be shared with the card reader 2000 by using a symmetric key generation algorithm.

In operation S132, the key manager 1217 of the secure block 1210 encrypts the generated symmetric key "K" by using the public key "P" included in the service certification SC. Accordingly, the symmetric key "K" generated by the key manager 1217 is encrypted by using the public key "P".

In operation S133, a symmetric key P(K) encrypted by using the public key "P" is sent to the card reader 2000.

In operation S134, the card reader 2000 decrypts the encrypted symmetric key P(K). The card reader 2000 may decrypt the encrypted symmetric key "K" by using a private key existing in the card reader 2000. The decrypted symmetric key "K" may be stored in the authentication storage 1215 (refer to FIG. 3) included in the card reader 2000. Afterwards, the card reader 2000 may send data encrypted by using the symmetric key "K" to the secure block 1210 of the user device 1000 or may decrypt an encrypted ciphertext by using the symmetric key "K".

In operation S135 and operation S136, the card reader 2000 and the user device 1000 exchange the time slots T1 and T2 ruling a response time of the transaction. That is, the card reader 2000 and the user device 1000 encrypt and exchange the first time slot T1 and the second time slot T2 by using the symmetric key "K". The first time slot T1 corresponds to a response time with which the card reader 2000 complies with regard to the request of the user device 1000. In operation S135, the card reader 2000 sends a first encrypted time slot K(T1), which is encrypted by using the symmetric key "K", to the secure block 1210 of the user device 1000. The secure block 1210 decrypts and stores the encrypted first time slot K(T1).

In operation S136, the secure block 1210 encrypts the second time slot T2 by using the symmetric key "K". The secure block 1210 sends an encrypted second time slot K(T2) to the card reader 2000. The card reader 2000 may decrypt the encrypted second time slot K(T2) by using the symmetric key "K" and may store the decrypted second time slot T2 in the authentication storage 1215.

In operation S137, the card reader 2000 generates a first random number R1 and sends the first random number R1 to the secure block 1210.

In operation S138, the secure block 1210 encrypts the first random number R1 received from the card reader 2000 by using the symmetric key "K". The secure block 1210 generates a second random number R2. The second random number R2 generated by the secure block 1210 and the encrypted first random number K(R1) are sent to the card reader 2000 through the NFC block 1230. In this case, a time point at which the second random number R2 and the encrypted first random number K(R1) are sent may be within the second time slot T2 from a time point at which the first random number R1 is received from the card reader 2000. A point in time to send the second random number R2 and the encrypted first random number K(R1) may be managed with reference to the input/output timer 1232 (refer to FIG. 4) of the NFC block 1230 so as to be sent within the second time slot T2.

In operation S139, the card reader 2000 receives the second random number R2 and the encrypted first random number K(R1). When a time point at which the second random number R2 and the encrypted first random number K(R1) are received is out of the second time slot T2, the authentication process may be terminated. However, when the time point at which the second random number R2 and the encrypted first random number K(R1) are received is within the second time slot T2, the card reader 2000 decrypts the encrypted first random number K(R1) by using the symmetric key "K". The card reader 2000 encrypts the received second random number R2 by using the symmetric key "K". In this case, there may be evaluated whether the decrypted first random number R1 is matched with the first random number R1 that the card reader 2000 previously generates. When it is determined that the decrypted first random number R1 is different from the first random number R1 that the card reader 2000 generates, the authentication process may be terminated. In contrast, when it is determined that the decrypted first random number R1 is matched with the first random number R1 that the card reader 2000 generates, the card reader 2000 sends an encrypted second random number K(R) to the secure block 1210 of the user device 1000. In this case, the encrypted second random number K(R2) may be sent within the first time slot T1.

In operation S140, the secure block 1210 of the user device 1000 receives the encrypted second random number K(R2). When a time point at which the encrypted second random number K(R2) is received is out of the first time slot T1, the authentication process may be terminated. However, when the time point at which the encrypted second random number K(R2) is received is within the first time slot T1, the secure block 1210 decrypts the encrypted second random number K(R2) by using the symmetric key "K".

There may be detected whether the decrypted second random number R2 is matched with the second random number R2 that the secure block 1210 generates. When it is determined that the decrypted second random number R2 is matched with the second random number R2 that the secure block 1210 generates (Yes), that the authentication in the inactive state succeeds is determined. In this case, the procedure proceeds to operation S142, and the secure block 1210 of the user device 1000 may send an authentication success message to the card reader 2000. In contrast, when it is determined that the decrypted second random number R2 is not matched with the second random number R2 that the secure block 1210 generates (No), that the authentication in the inactive state fails is determined. Accordingly, the secure block 1210 may not answer to the card reader 2000, and the authentication process may be terminated.

According to the above description, the card reader 2000 and the secure block 1210 of the user device 1000 may share the symmetric key "K" by using the public key "P" in the inactive state. In addition, it may be possible to exchange random numbers by using the symmetric key "K", to exchange time slots ruling a mutual response time, and to monitor to respond in compliance with the time slot. Through the above secure authentication, a high secure performance may be provided against various secure attacks including a man-in-the-middle attack, in the inactive state of the user device 1000.

Figure 8:
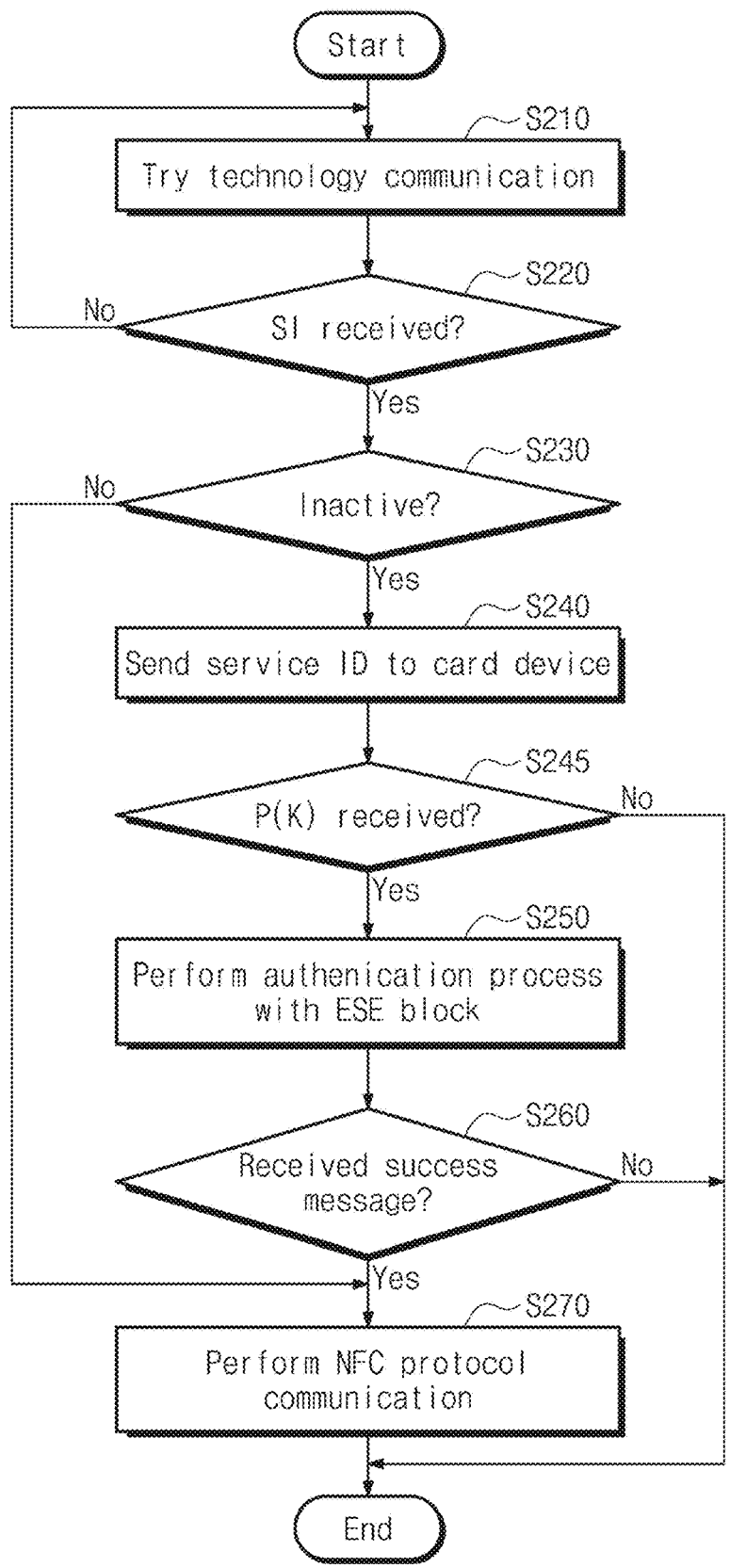
FIG. 8 is a flowchart illustrating an authentication operation of a card reader illustrated in FIGS. 6 and 7.

FIG. 8 is a flowchart illustrating an authentication operation of a card reader illustrated in FIGS. 6 and 7. Referring to FIG. 8, the card reader 2000 may perform the authentication process according to example embodiments of the inventive concepts depending on the status information SI of the user device 1000.

In operation S210, the card reader 2000 may try the technology communication with the user device 1000. To periodically recognize the communication-possible user device 1000, the card reader 2000 detects an RF field and emits an RF field for communication. When the communication-possible user device 1000 is recognized, the card reader 2000 may send an initial instruction of a ruled transfer speed. When the user device 1000 recognizes the initial instruction from the card reader 2000, data for initialization may be exchanged at the ruled transfer speed. In this case, the user device 1000 may send the status information SI indicating whether the user device 1000 is in the active state or the inactive state, to the card reader 2000.

In operation S220, the card reader 2000 checks whether the status information SI is received from the user device 1000. When it is determined that the status information SI is received from the user device 1000 (Yes), the procedure proceeds to operation S230. In contrast, when it is determined that the status information SI is not received from the user device 1000 (No), the procedure returns to operation S210.

In operation S230, the card reader 2000 checks the status information SI. When the status information SI received from the user device 1000 indicates the inactive state (Yes), the procedure proceeds to operation S240. In contrast, when the status information SI received from the user device 1000 indicates the active state (No), the procedure proceeds to operation S270.

In operation S240, the card reader 2000 may send the service ID to the user device 1000. The service ID sent from the card reader 2000 is provided to the secure block 1210 of the user device 1000. The secure block 1210 determines whether the service ID sent from the card reader 2000 is identical to the service ID of the service certification SC. When the same service ID is present in the secure block 1210, the secure block 1210 may send the symmetric key P(K) encrypted by using the public key "P" to the card reader 2000.

In operation S245, the card reader 2000 determines whether the symmetric key P(K) encrypted by using the public key "P" is received from the user device 1000. When it is determined that the symmetric key P(K) encrypted by using the public key "P" is not received from the user device 1000 (No), the card reader 2000 may terminate the authentication process. In contrast, when it is determined that the symmetric key P(K) encrypted by using the public key "P" is received from the user device 1000 (Yes), the procedure proceeds to operation S250.

In operation S250, the card reader 2000 may perform the authentication process in the inactive state of the inventive concepts based on the service certification SC shared with the user device 1000. That is, the card reader 2000 decrypts the encrypted symmetric key P(K) and shares the symmetric key "K" with the secure block 1210 of the user device 1000. The card reader 2000 sets the time slots T1 and T2 based on the symmetric key "K" and exchanges random numbers R1 and R2 encrypted in compliance with the time slots T1 and T2. When it is determined that the exchanged random numbers R1 and R2 are matched with the generated random numbers and the time slots T1 and T2 are observed, the authentication process of the inventive concepts may be determined as a success.

In operation S260, the card reader 2000 checks whether the authentication success message is received from the user device 1000. When it is determined that the authentication success message is not received from the user device 1000 (No), the card reader 2000 may terminate the authentication process. In contrast, when it is determined that the authentication success message is received from the user device 1000 (Yes), the procedure proceeds to operation S270.

In operation S270, the card reader 2000 performs the protocol communication with the user device 1000. The card reader 2000 may perform an additional follow-up operation, such as mutual data transfer or money pay, through a target block (e.g., an application processor) and the NFC device 1200.

Figure 9:
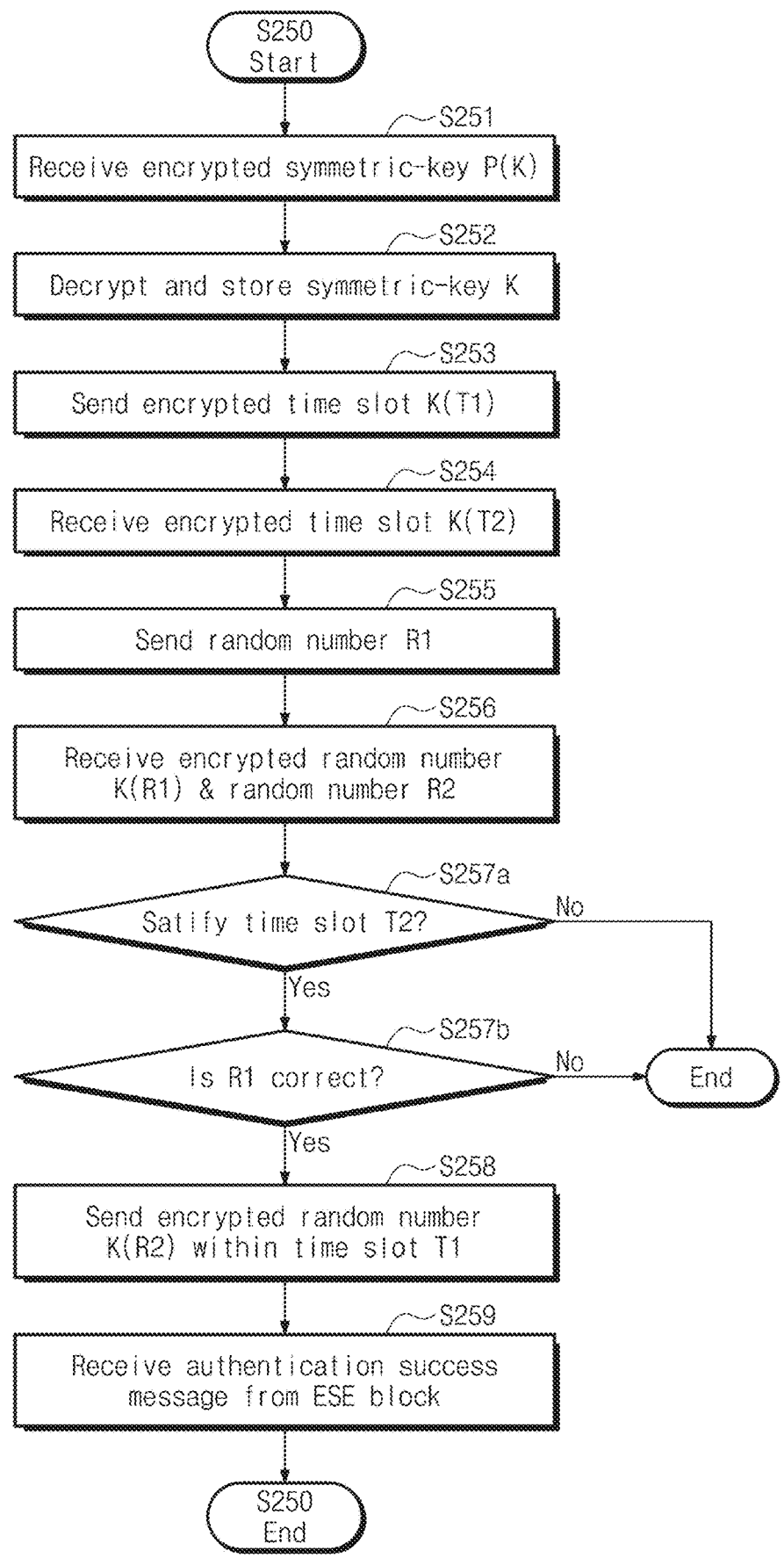
FIG. 9 is a flowchart describing operation S250 performed by a card reader of FIG. 8 in detail.

FIG. 9 is a flowchart describing operation S250 performed by a card reader of FIG. 8 in detail. Referring to FIG. 9, the card reader 2000 may share the symmetric key "K" with the user device 1000, may encrypt/decrypt the random numbers R1 and R2 based on the symmetric key "K", and may set the time slots T1 and T2.

In operation S251, the card reader 2000 receives the symmetric key P(K) encrypted by using the public key "P" from the user device 1000.

In operation S252, the card reader 2000 decrypts the encrypted symmetric key P(K) by using private key. The decrypted symmetric key "K" may be stored in the authentication storage 1215 included in the card reader 2000.

In operation S253, the card reader 2000 sends the first time slot T1 to the user device 1000. In detail, the card reader 2000 encrypts the first time slot T1 by using the symmetric key "K" before sending the first time slot T1 to the user device 1000. The first time slot T1 is a value defining a response time of the card reader 2000 with respect to a request of the user device 1000 in a random number exchange operation to be performed later.

In operation S254, the card reader 2000 receives the encrypted second time slot K(R2) from the user device 1000. The card reader 2000 may decrypt the encrypted second time slot K(T2) and may store the decrypted second time slot T2 in a designated storage area. The second time slot T2 is a value defining a response time of the user device 1000 with respect to a request of the card reader 2000 in a random number exchange operation to be performed later.

In operation S255, the card reader 2000 generates the first random number R1 and sends the first random number R1 to the user device 1000. To generate the first random number R1, the card reader 2000 may drive a separate random number generator or a random number generation algorithm.

The user device 1000 that receives the first random number R1 encrypts the received first random number R1 by using the symmetric key "K". The user device 1000 generates the second random number R2. The user device 1000 may send the generated second random number R2 and encrypted first random number K(R1) to the card reader 2000.

In operation S256, the card reader 2000 receives the second random number R2 and the encrypted first random number K(R1) sent from the user device 1000.

In operation S257a and operation S257b, the card reader 2000 determines whether the second time slot T2 and the first random number R1 are satisfied. In operation S257a, the card reader 2000 determines whether a transmission time of the second random number R2 and the encrypted first random number K(R1) of the user device 1000 complies with the second time slot T2. When a response of the user device 1000 satisfies the second time slot T2 (Yes), the procedure proceeds to operation S257b. In contrast, when the response of the user device 1000 does not satisfy the second time slot T2 (No), the authentication process performed in the inactive state is terminated.

In operation S257b, the card reader 2000 decrypts the encrypted first random number K(R1) sent from the user device 1000 by using the symmetric key "K". The card reader 2000 checks whether the decrypted first random number R1 is matched with the first random number R1 first generated. When the decrypted first random number R1 is matched with the first random number R1 first generated (Yes), the procedure proceeds to operation S258. In contrast, when the decrypted first random number R1 is not matched with the first random number R1 first generated (No), the authentication process performed in the inactive state is terminated.

In operation S258, the card reader 2000 encrypts the second random number R2 received from the user device 1000 by using the symmetric key "K". The card reader 2000 sends the encrypted second random number K(R2) to the user device 1000. In this case, the card reader 2000 may send the encrypted second random number K(R2) within the first time slot T1 from a time point at which the second random number R2 is received from the user device 1000. The user device 1000 determines a success/fail of the authentication depending on a decrypted value of the encrypted second random number K(R2) and whether the first time slot T1 is observed. When the authentication succeeds, the user device 1000 may send the authentication success message.

In operation S259, the card reader 2000 receives the authentication success message. In response to the authentication success message, the card reader 2000 may perform the protocol communication with the user device 1000. When the authentication success message is not received, the card reader 2000 may determine that the authentication process in the inactive state fails and may terminate the procedure.

Figure 10:
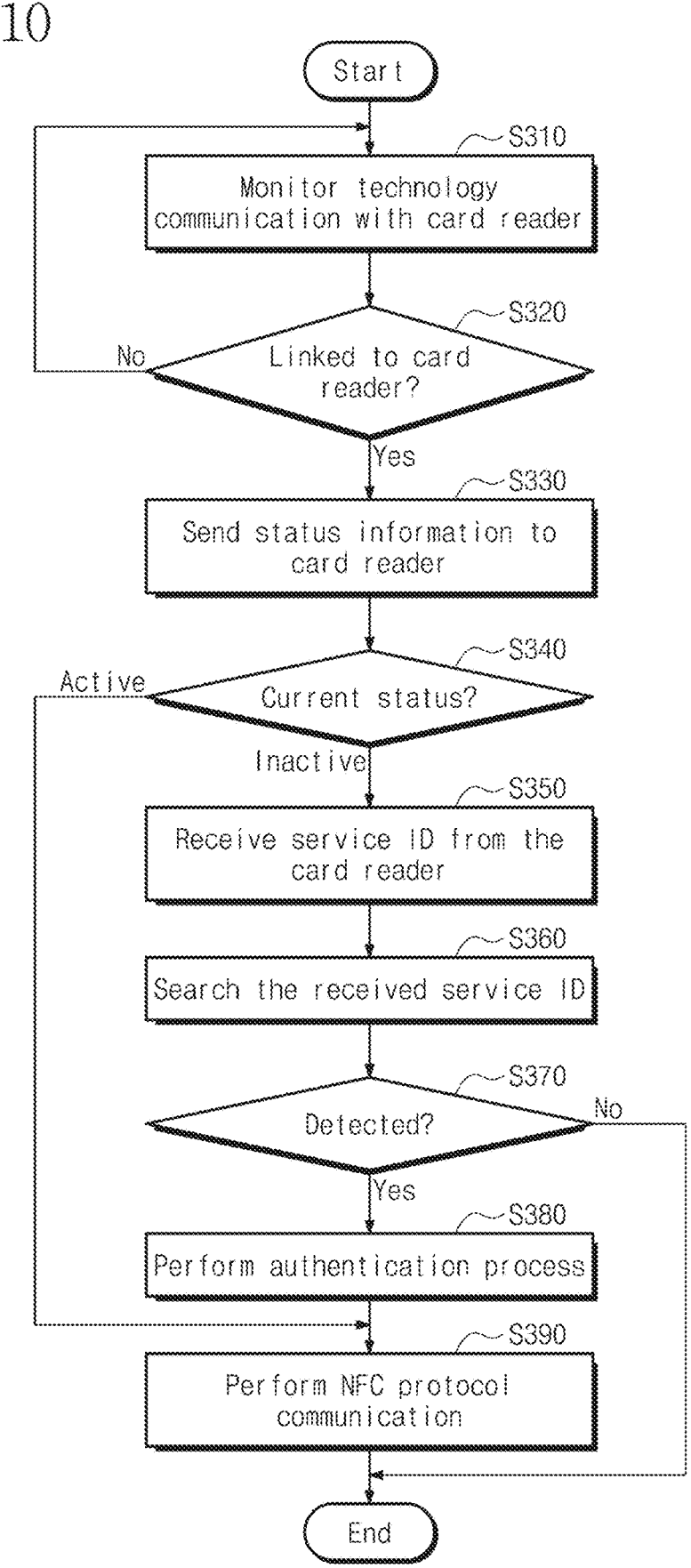
FIG. 10 is a flowchart illustrating an authentication operation of a user device illustrated in FIGS. 6 and 7.

FIG. 10 is a flowchart illustrating an authentication operation of a user device illustrated in FIGS. 6 and 7. Referring to FIG. 10, the user device 1000 may perform the authentication process of the inventive concepts depending on the status information SI.

In operation S310, the user device 1000 checks whether the card reader 2000 is connected (or linked). That is, the user device 1000 monitors whether the technology communication with the card reader 2000 is possible. The user device 1000 detects an RF field emitted from the card reader 2000 and receives an initial instruction of a ruled transfer speed sent from the card reader 2000.

In operation S320, through the technology communication with the card reader 2000, the user device 1000 checks whether transfer speed or wireless communication settings are mutually synchronized, that is, checks whether the user device 1000 and the card reader 2000 are linked. When it is determined that the user device 1000 and the card reader 2000 are linked (Yes), the procedure may proceed to operation S330. In contrast, when it is determined that the user device 1000 and the card reader 2000 are not linked (No), the procedure may proceed to operation S310.

In operation S330, the user device 1000 sends the status information SI to the card reader 2000. The status information SI may be sent while the technology communication is performed. For example, in the case where the display of the user device 1000 is in the display on state, the user device 1000 may send the status information SI corresponding to the active state to the card reader 2000. In contrast, in the case where the display of the user device 1000 is in the display off state or the user device 1000 is in the power-off state, the user device 1000 may send the status information SI corresponding to the inactive state to the card reader 2000.

In operation S340, the user device 1000 performs the operation branch depending on the status information SI sent to the card reader 2000. When a current state is an active state (Active), the procedure proceeds to operation S390 in which the protocol communication with the card reader 2000 is performed. In contrast, when the current state of the user device 1000 is an inactive state (Inactive), the procedure proceeds to operation S350.

In operation S350, the user device 1000 receives the service ID from the card reader 2000.

In operation S360, the user device 1000 searches the service certification SC downloaded by the user device 1000 for a service ID corresponding to the received service ID. In detail, the user device 1000 may search the authentication storage 1215 included in the secure block 1210 for the service ID corresponding to the received service ID.

In operation S370, the user device 1000 may determine whether the service ID of the service certification SC stored in the authentication storage 1215 is matched with the received service ID. When the service ID stored in the authentication storage 1215 is matched with the service ID sent from the card reader 2000 (Yes), the procedure proceeds to operation S380 for the purpose of performing the authentication process of the inventive concepts. In contrast, when the service ID that is matched with the service ID sent from the card reader 2000 is absent from the authentication storage 1215 (No), the authentication process of the inventive concepts performed in the inactive state may be terminated. In this case, the user device 1000 may not answer to the card reader 2000.

In operation S380, the user device 1000 performs the authentication process of the inventive concepts based on the service certification SC shared with the card reader 2000. That is, the user device 1000 and the card reader 2000 may perform the authentication in a way to generate and exchange the symmetric key "K" based on the public key "P" included in the service certification SC and to generate and exchange a random number by using the exchanged symmetric key. In addition, the user device 1000 and the card reader 2000 may exchange time slots by using the symmetric key and may monitor the time slot and the response time.

In operation S390, the protocol communication is performed between the user device 1000 and the card reader 2000. That is, a target block (e.g., an application processor)

and the card reader 2000 may perform an additional operation through the NFC device 1200, such as mutual data transfer or money pay.

Figure 11:
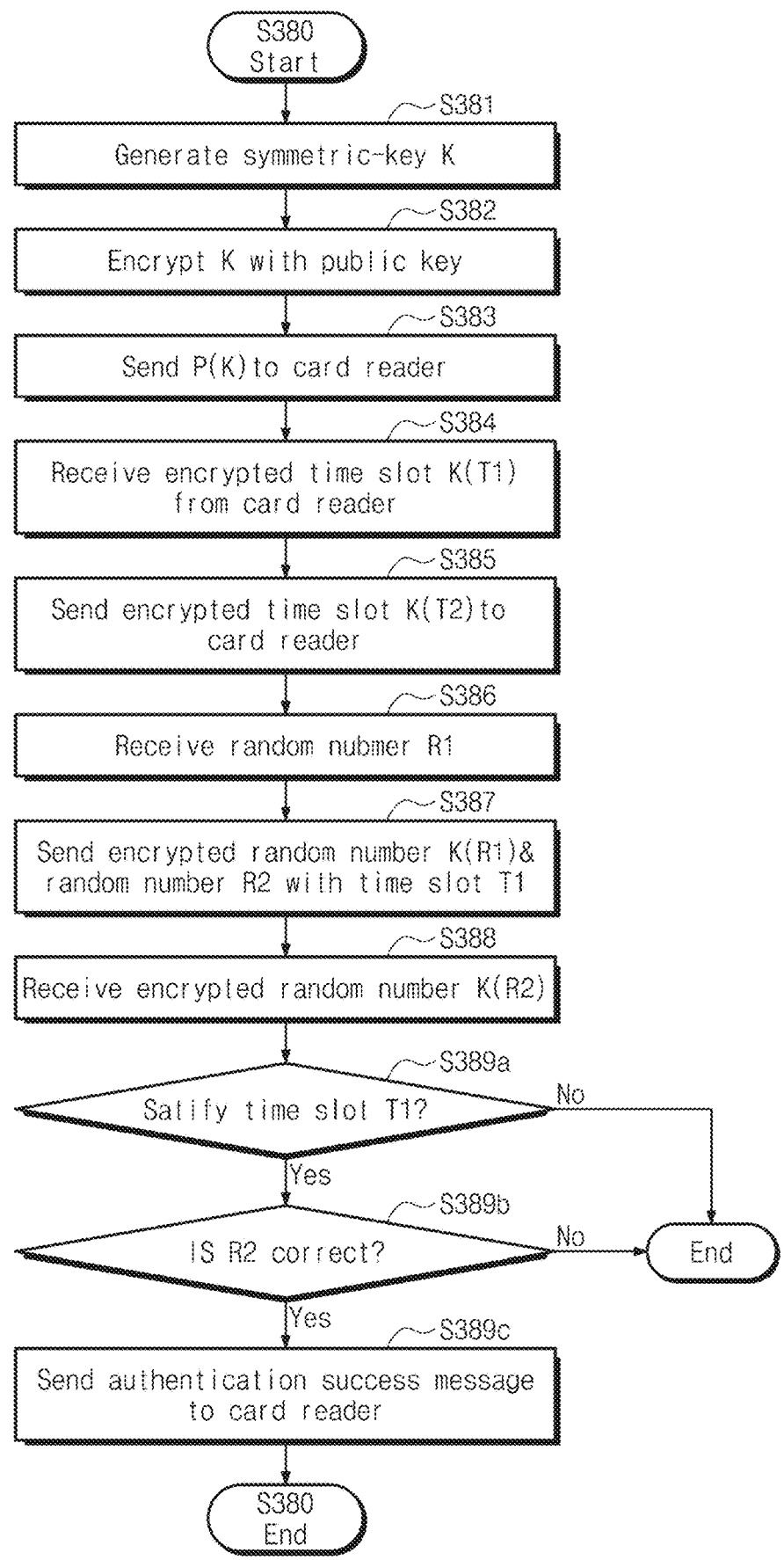
FIG. 11 is a flowchart illustrating operation S380 of FIG. 10.

FIG. 11 is a flowchart illustrating operation S380 of FIG. 10 in detail. Referring to FIG. 11, the user device 1000 may share the symmetric key "K" with the card reader 2000, may encrypt/decrypt the random numbers R1 and R2 based on the symmetric key "K", and may set the time slots T1 and T2. When the service ID sent from the card reader 2000 is detected, the user device 1000 performs a following authentication process.

In operation S381, the user device 1000 generates the symmetric key "K" to be shared with the card reader 2000 by using a symmetric key generation algorithm.

In operation S382, the user device 1000 encrypts the generated symmetric key "K" by using the public key "P" included in the service certification SC. Accordingly, the symmetric key "K" may be generated as the symmetric key P(K) encrypted by the public key "P".

In operation S383, the symmetric key P(K) encrypted by using the public key "P" is sent to the card reader 2000. In this case, the card reader 2000 encrypts the first time slot T1 by using the received symmetric key "K" before sending the first time slot T1 to the user device 1000.

In operation S384, the user device 1000 receives the first time slot K(T1) encrypted by using the symmetric key "K". The user device 1000 decrypts and stores the encrypted first time slot K(T1) by using the symmetric key "K".

In operation S385, the user device 1000 may encrypt the second time slot T2 by using the symmetric key "K" before sending the second time slot T2 to the card reader 2000. The second time slot T2 is a value defining a response time of the user device 1000 with respect to a request of the card reader 2000 in a random number exchange operation to be performed later. In this case, the card reader 2000 generates the first random number R1 and sends the first random number R1 to the user device 1000.

In operation S386, the user device 1000 receives the first random number R1 sent from the card reader 2000.

In operation S387, the user device 1000 encrypts the received first random number R1 by using the symmetric key "K". The user device 1000 generates the second random number R2. The user device 1000 may send the generated second random number R2 and the encrypted first random number K(R1) to the card reader 2000. The second random number R2 and the encrypted first random number K(R1) may be sent within the first time slot T1 from a time point at which the first random number R1 is received from the card reader 2000.

In operation S388, the user device 1000 receives the encrypted second random number K(R2) sent from the card reader 2000.

In operation S289*a*, operation S289*b*, and operation S289*c*, the user device 1000 determines whether the first time slot T1 and the second random number R2 are satisfied. In operation S289*a*, the user device 1000 determines whether a time from a time point at which the second random number R2 is received by the card reader 2000 to a time point at which the encrypted second random number K(R2) is sent complies with the first time slot T1. When a response of the card reader 2000 satisfies the first time slot T1 (Yes), the procedure proceeds to operation S389*b*. In contrast, when the response of the card reader 2000 does not satisfy the first time slot T1 (No), the authentication process performed in the inactive state is terminated.

In operation S389*b*, the user device 1000 decrypts the encrypted second random number K(R2) sent from the card reader 2000 by using the symmetric key "K". Whether the decrypted second random number R2 is matched with the second random number R2 generated by the user device 1000 is checked. When the decrypted second random number R2 is matched with the second random number R2 first generated (Yes), the procedure proceeds to operation S389*c*. In contrast, when the decrypted second random number R2 is not matched with the second random number R2 first generated (No), the authentication process performed in the inactive state is terminated.

In operation S389*c*, the user device 1000 may send the authentication success message for the purpose of informing the card reader 2000 that the authentication process performed in the inactive state succeeds.

According to an example embodiment of the inventive concepts, a given secure authentication operation may be performed even in a state where a power of a user device using NFC communication is turned off or a display of the user device is turned off. Accordingly, a secure performance of the user device may be improved.

The user device 1000 including the host device 1100 and the NFC device 1200 and the sub-components thereof including the application processor 1110, power controller 1130, the secure processor 1213 and the key manager 1217 of the secure block 1210 and the NFC processor 1233 and power manager 1237 of NFC block 1230 may include processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. Further the authentication storage 1215 of the secure block 1210 may include volatile memory and the read-only memory (ROM) 1235 of the NFC block 1230 may include non-volatile memory.

The processing circuitry may be special purpose processing circuitry such that, when the user device 100 is in an inactive state, the user device 1000 may provide the card reader 2000 with status information (SI) indicating that the user device 1000 is in the inactive state, to instruct the card reader 2000 to perform the authentication process of the inventive concepts based on a service certification SC shared with the user device 1000 through the service authentication server 3000. Therefore, the special purpose processing circuitry may improve the security of the NFC communication between the user device 1000 and the card reader 2000 by blocking an attack or hacking that may occur while the user device 1000 is the inactive.

While the inventive concepts has been described with reference to example embodiments thereof, it will be apparent to those of ordinary skill in the art that various changes and modifications may be made thereto without departing from the spirit and scope of the inventive concepts as set forth in the following claims.

What is claimed is:

1. A method of operating a user device which performs near field communication (NFC) with a card reader, the method comprising:
   storing a service certification downloaded from a service authentication server through a network;
   sending status information to the card reader, the status information indicating whether a status of the user device is inactive;

selectively performing an authentication process of authenticating the card reader based on a symmetric key, only in response to the status of the user device being inactive and a service ID received from the card reader corresponding to the service certification stored in the user device; and sending an authentication success message from the user device to the card reader in response to the user device confirming the authenticity of the card reader through the authentication process.

2. The method of claim 1, wherein the status information includes information about whether the user device is in an inactive state or an active state.

3. The method of claim 2, wherein the card reader is configured to, send the service ID to the user device, in response to the user device being in the inactive state based on a display of the user device being turned off, and perform protocol communication with the user device, in response to the user device being in the active state based on the display of the user device being turned on.

4. The method of claim 1, wherein the service certification further includes a public key for encrypting or decrypting the service ID and the symmetric key.

5. The method of claim 4, wherein the performing of the authentication process with the card reader comprises:

generating, by the user device, the symmetric key;

encrypting the symmetric key using the public key to generate an encrypted symmetric key; and sending the encrypted symmetric key to the card reader.

6. The method of claim 5, wherein the performing of the authentication process with the card reader further comprises:

receiving a first encrypted time slot from the card reader, the first encrypted time slot including a first time slot encrypted using the symmetric key; and sending a second encrypted time slot to the card reader, the second encrypted time slot including a second time slot encrypted using the symmetric key.

7. The method of claim 6, wherein the performing of the authentication process with the card reader further comprises:

receiving a first random number from the card reader;

encrypting the first random number using the symmetric key to generate an encrypted first random number;

generating, by the user device, a second random number; and sending the second random number and the encrypted first random number to the card reader.

8. The method of claim 7, wherein the sending the second random number and the encrypted first random number to the card reader comprises:

sending the second random number and the encrypted first random number to the card reader such that a time from receipt of the first random number to a time at which the second random number and the encrypted first random number are sent is within the second time slot.

9. The method of claim 7, wherein the performing of the authentication process with the card reader further comprises:

receiving an encrypted second random number from the card reader, the encrypted second random number including the second random number encrypted using the symmetric key;

decrypting the encrypted second random number using the symmetric key to extract a decrypted second random number; and determining whether the decrypted second random number corresponds to the second random number previously generated by the user device.

10. The method of claim 9, wherein the user device determines that the authentication process is successful, in response to the decrypted second random number extracted from the encrypted second random number received from the card reader corresponding to the second random number previously generated by the user device.

* * * * *